United States Patent [19]

Fischer et al.

[11] Patent Number: 4,558,985
[45] Date of Patent: Dec. 17, 1985

[54] PUMP WITH SCREW CONVEYORS ON EACH END

[75] Inventors: Alfred Fischer, Hamburg; Claus Freimuth, Gross Hansdorf; Roland Gerlach, Hamburg; Gerhard Siefert, Reinbek, all of Fed. Rep. of Germany

[73] Assignee: Claudius Peters AG, Fed. Rep. of Germany

[21] Appl. No.: 509,026

[22] Filed: Jun. 29, 1983

[30] Foreign Application Priority Data

Jul. 2, 1982 [DE] Fed. Rep. of Germany ....... 3224710

[51] Int. Cl.⁴ .......................... F04D 3/02; B65G 33/24
[52] U.S. Cl. ...................................... 415/74; 366/192; 198/671
[58] Field of Search ............... 415/72, 74, 75; 366/77, 366/192; 198/669, 671

[56] References Cited

U.S. PATENT DOCUMENTS

| | | | |
|---|---|---|---|
| 2,042,641 | 6/1936 | Victoria | 415/74 |
| 2,131,453 | 9/1938 | Patteson | 415/75 X |
| 3,191,229 | 6/1965 | Vanzo | 366/77 X |
| 3,387,696 | 6/1968 | Prentice | 198/671 X |
| 3,451,531 | 6/1969 | Barnes | 198/671 |
| 4,109,966 | 8/1978 | Boyhont et al. | 198/669 X |

FOREIGN PATENT DOCUMENTS

| | | | |
|---|---|---|---|
| 863780 | 1/1953 | Fed. Rep. of Germany | |
| 2110816 | 6/1972 | France | |
| 699962 | 11/1953 | United Kingdom | 198/669 |

*Primary Examiner*—Robert E. Garrett
*Assistant Examiner*—Joseph M. Pitko
*Attorney, Agent, or Firm*—Eric P. Schellin

[57] ABSTRACT

An annular nonreturn valve is provided in a pump with a screw conveyor mounted at each end. This nonreturn valve seals the outlet end of the pump. It also makes it possible for the conveyed material to be discharged without deflection in the slug area. The pivotability of the sealing element is made possible by the fact that the screw conveyor shaft has a smaller diameter in the direction of conveying behind the annular nonreturn valve. An area with enlarged diameter of the screw conveyor shaft can be provided on a casing so that wear parts can be easily replaced.

7 Claims, 3 Drawing Figures

PUMP WITH SCREW CONVEYORS ON EACH END

FIELD OF THE INVENTION

The invention is relative to a pump with a screw conveyor mounted at each end for conveying solid pulverized and granular material with an inlet for the material to be conveyed and an outlet for discharging the material into a chamber under a higher gas pressure than the inlet. The device is provided with a nonreturn valve with a pivotable closing element which is located in the area between the two screw conveyors.

BACKGROUND OF THE INVENTION

In pumps of this type pneumatically conveyable bulk material is fed from an infeed container into a conveyor line in which a higher gas pressure prevails than at the feed area. In order that the gas cannot pass from the conveyor line through the pump to the infeed area and escape at that point, a nonreturn valve is provided. The nonreturn valve is not opened until an appropriate pressure of material conveyed by the pump has developed during the operation of the pump. Since the chamber in front of the nonreturn valve (viewed in the direction of conveying) is then filled with material, the gas cannot escape to the rear.

The nonreturn valve can be a simple flap with an appropriate fastening with a pivotable lever if the screw conveyor is mounted only at its front end, i.e., in the vicinity of the infeed area (German Federal Republic application DE-AS No. 25 07 678). However, such a pump has the disadvantage that, particularly at high rpm's, the free end of the screw conveyor can vibrate, which vibrations can only be overcome with difficulty and great technical expense. In any case, it is simpler and more reliable to mount the screw conveyor at each end.

Then, however, there is naturally the problem that a simple nonreturn valve can no longer be arranged at the outlet end of the screw conveyor. This outlet valve was therefore positioned at the side of the screw conveyor (German Federal Republic application DE-AS No. 27 51 773). However, this results in the following disadvantage. The material to be conveyed is compressed in the vicinity of the nonreturn valve. This compression might be desirable, in order to achieve said seal against backflowing gas. If this compressed material must be deflected laterally too, possible by 90°, additional energy is required for this. There is also a greater load on the bearings and very great wear. These disadvantages can be reduced by an enlarged shaft diameter with ribs added in the discharge area. Then, however, there is no longer the possibility of making the end areas of the screw conveyor spiral, which wear down especially rapidly, exchangeable.

There is also the possibility of positioning the rear mounting of the screw conveyor in the current of material (European application EP - OS No. 00 41 279). For this, the screw conveyor housing is lengthened somewhat, the rear bearing is positioned on supports between which the material flows and the nonreturn valve is provided behind this mounting. Then, however, there are problems in as far as it cannot be prevented that very fine granular material can penetrate into the rear bearing and gradually destroy it.

Finally, the attempt was made to manufacture the nonreturn valve from two elements which surround the screw conveyor shaft in the vicinity of the outlet opening (French Pat. No. 2,110,816). In this instance, however, a good seal is not achieved, as several slits remain open between the individual closing elements. On the other hand, if the slit between the individual flap elements is made small, there is the danger that these elements can jam against each other. Also, vortices will necessarily occur at the additional edges of the flaps which result in greater wear, as the slug of bulk material conveyed by the screw conveyor rotates at least partially together with the screw conveyor.

SUMMARY OF THE INVENTION

The invention has the task of creating a simple, reliable and efficient nonreturn valve for a pump of the type initially mentioned.

The invention solves this task as follows: The pivotable closing element is an annular element which surrounds the screw conveyor shaft, the screw conveyor shaft has an area at least directly in front of the location of the annular element, viewed in the direction of conveying, in its closed position in which area the diameter of the screw conveyor shaft is greater than the internal diameter of the annular element, which for its part is greater than the diameter of the screw conveyor shaft behind the annular element.

The nonreturn valve has essentially the same simple construction as the plate-like nonreturn valve in pumps with the shaft mounted at one end. However, it is constructed in an annular fashion and surrounds the shaft. In the closed position the annular closing element lies against the screw conveyor housing and the screw conveyor shaft in a sealing manner, whereby it lies against the screw conveyor shaft at the area with an enlarged diameter either directly or with an intermediary space, i.e., with play. Since the screw conveyor shaft has a smaller diameter than the internal diameter of the annular element directly behind this area of enlarged diameter, the annular element can execute a pivoting movement like a normal plate-like nonreturn valve without touching the screw conveyor shaft. Stops can assure that the nonreturn valve does not open so far that the annular element even touches the screw conveyor shaft.

It is advantageous if the surfaces at the area of a greater diameter of the screw conveyor shaft and of the annular element are constructed so that they are provided with cooperating sealing surfaces in order to effectively prevent air and/or conveyed material from passing between the area of a greater diameter and the annular element in an undesirable fashion. The annular element can make direct contact at the area of greater diameter, which results in an especially good seal. However, the problem of wear then occurs, since the screw conveyor shaft rotates and the annular element stands still. In order to avoid the resulting wear, it is advantageous to provide that the annular element lies with play in a closed state at the area of greater diameter. Especially advantageous values for the play, i.e., the intermediary space between the annular element and the surface of the area of greater diameter in the closed state, are those of approximately 0.2 to 0.5 mm.

A greater pivoting range of the annular element is achieved if the pivoting axis of the annular element is located in the axial direction of the screw conveyor shaft in the area behind the annular element when it is in closed position. This pivoting range is especially great if the pivoting axis of the annular element is located in the axial direction in the area in which the annular element moves.

If the diameter of the screw conveyor shaft gradually increases before the area of enlarged diameter in a forward direction, the material is backed up and compressed here during pump operation in order to better form a material slug which prevents air from flowing in a backward direction. This slug may make it partially no longer necessary to use the nonreturn valve during operation.

A particularly simple construction would be for the screw conveyor shaft to have a greater diameter in front of the annular element when it is in closed position than behind the annular element, that is, a step at the valve site. It is also possible to provide an area with locally enlarged diameter of the screw conveyor shaft. This area can be located, for example, at a removable casing for the screw conveyor shaft. As friction occurs between the annular closing element and the sealing surface of the area of enlarged diameter, wear is unavoidable due to the material which passes through at that point even when these parts do not touch each other. If this area is located at the removable casing, it is easy to replace wear parts. The casing can extend forward through the entire outlet chamber, so that even the erosion occuring in the outlet chamber as a result of the conveyed material only wears down a replaceable casing which is easy to replace.

Another improvement consists in that the screw conveyor and seals located on the screw conveyor shaft and bearings are also located on removable casings for the screw conveyor shaft, whereby all casings can shift on the screw conveyor shaft in an axial direction and can be pulled off it. This creates the possibility of easily changing other wear parts, which can be important, for example, in the area of the seals, since heavy wear can also occur there. The casings must of course be secure against rotation on the screw conveyor shaft. They can be connected together in a non-rotating manner by appropriate claws, grooves and springs or the like on the rotating shaft.

Another advantage of this construction is the fact that all casings can be shifted relative to the screw conveyor shaft. If, for example, a bearing casing is held fast by appropriately constructed bearings in an axial direction, the other casings and with them the screw conveyor shaft too can be shifted in an axial direction. This makes it possible to set and readjust the play between the area of enlarged diameter and the annular element especially well, precisely and simply.

Since the rear end areas of the screw conveyor wear down especially rapidly, it is desirable to make them of especially wear-resistant material and to make them replaceable. However, this is difficult to accomplish in the case of screw conveyor shafts mounted at both ends.

These problems can also be solved by the device of the invention if a removable casing or several casings are provided, which makes it possible for the rear ends areas to be pulled off over an area of lesser diameter of the shaft. This embodiment is particularly advantageous if other casings are also provided for seals, bearings, etc. If, on the other hand, casings are used which do not extend all the way through and which contact each other, the fastening elements for the end areas of the screw conveyor can be constructed so that they are covered in an assembled state by the casing of the area of enlarged diameter.

These and further operational and constructional characteristics of the invention will be more evident from the detailed description given hereinafter with reference to the figures of the accompanying drawings which illustrate one preferred embodiment by way of non-limiting example.

DESCRIPTION OF THE PREFERRED EMBODIMENT

Figure 1:
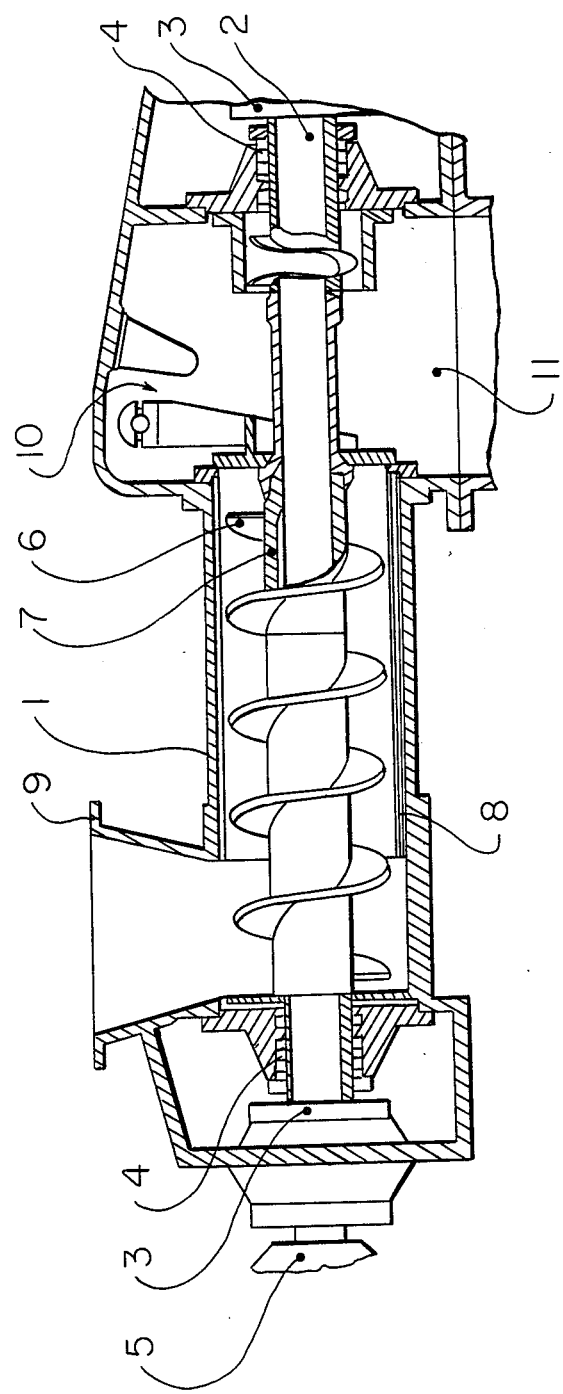
FIG. 1 shows an embodiment of the pump of the invention in schematic section.

A shaft 2 is located in housing 1 of the pump, which shaft is provided on its front and its rear end (viewed in the direction of flow) with bearings schematically indicated at 3. It is also possible to provide devices designated by 4 which are intended to prevent the material to be conveyed from entering into the bearings and damaging them. The screw conveyor shaft can be provided on its front end with drive 5. In the embodiment shown, screw conveyor 6 is not attached directly to screw conveyor shaft 2 in the end area, but rather to casing 7. The actual pump chamber is not limited by housing wall 1, but rather by another casing 8 which is of subordinate importance, however, for the invention. Opening 9 is provided above the screw conveyor for introducing the material to be conveyed. This material is conveyed to the right by the screw conveyor in the figures and then penetrates into outlet chamber 11, whereby nonreturn valve 10 opens, from which chamber it then passes into the pneumatic conveyor line or some other device under increased gas pressure.

Figure 2:
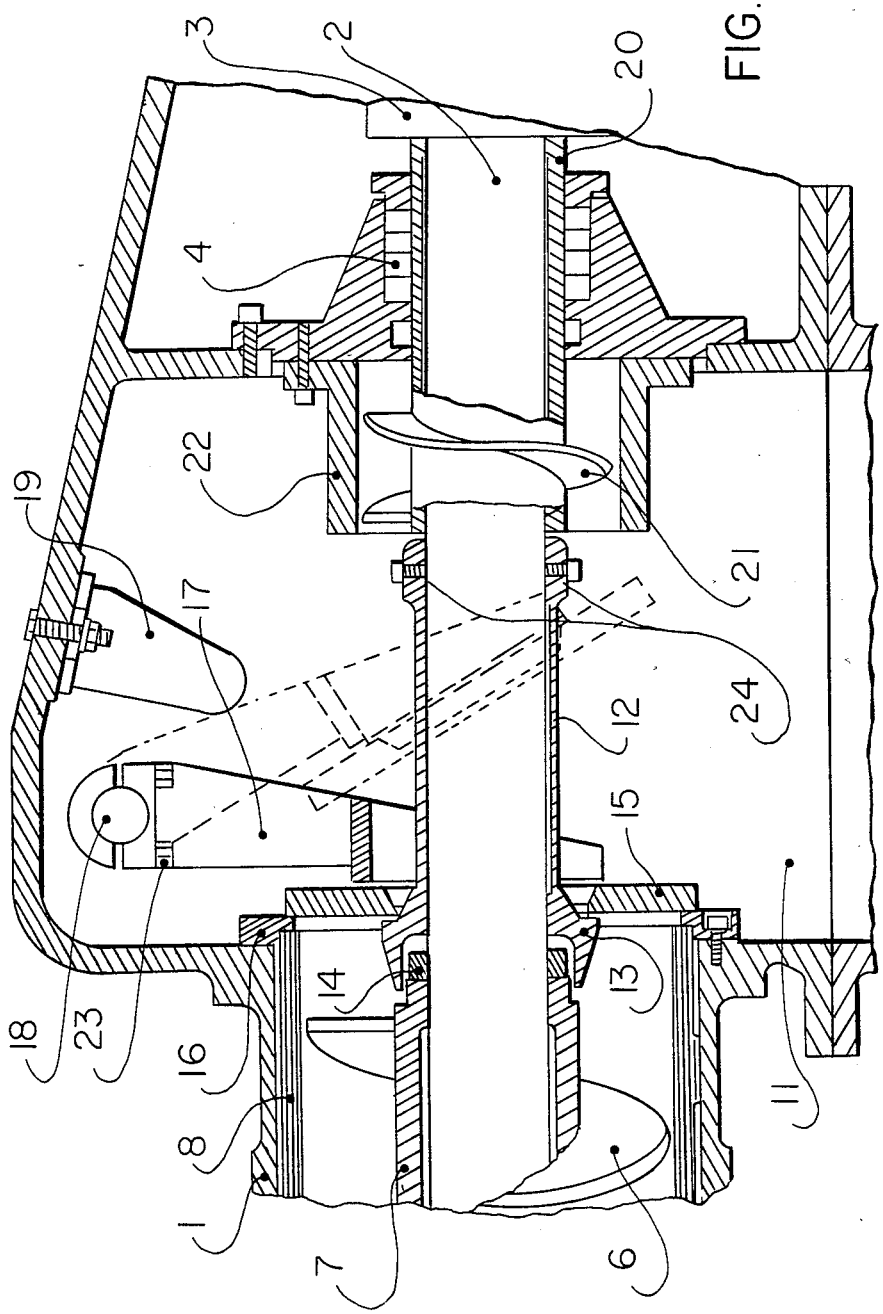
FIG. 2 shows the outlet area of the pump with the nonreturn valve of the invention on an enlarged scale.

FIG. 2 is a clearer view of the outlet end of the pump with the nonreturn valve of the invention.

A casing 12 is removably fastened by screws 24 to shaft 2 in the area of outlet chamber 11, which casing has an area 13 of enlarged diameter at its front end. This area 13 tapers down gradually to the rear, so that, as was described, the conveyed material is compressed here during the operation of the pump. Moreover, this casing area 13 with enlarged diameter fits over fastening devices for casing 7 and the removable areas of screw conveyor 6. These fastening devices are schematically shown at 14. On the back side of casing area 13 there is a level surface against which annular element 15 can lie in a sealing manner.

If casing 7 and screw conveyor 6 are divided (as is indicated at 25), these fastening devices can be constructed to hold fast the rear part of casing 7. Area 13 has a level surface on the back side against which annular element 15 can lie in a sealing fashion. It can contact area 13 directly to this end or with play, i.e., with an interval of 0.2 to 0.5 mm, which decreases the wear. Annular element 15 lies against the circumference of the screw conveyor chamber on housing 1 and/or outer casing 8 (in the figure over annulus 16), thereby closing off the outlet end of the pump. This annular element 15 has an internal diameter which is greater than the external diameter of casing 12 in the area located behind area 13 with enlarged diameter. It is fastened to lever 17, which is releasably fastened to pivot axle 18. The geometry is such that annular element 15 can move with pivot level 17 between the closed position shown in solid lines and the entirely open position shown in dotted lines. Adjustable stop 19 can be provided to limit the opening movement.

The entire arrangement is such that casing 12 can be removed from the rear end of shaft 12 after bearings 3, a front casing 20 with a known oppositely-running screw conveyor 21 and a casing 22 surrounding this screw conveyor have been disassembled. As is known, screw conveyor 21 has the purpose of building up a counterpressure of material so that material conveyed by the screw conveyor under pressure does not penetrate into rear housing 3. After casing 12 has been removed and also lever 17 with annular element 15 has been removed, which element is fastened by screws 23 to axle 18, the end areas of screw conveyor can also be replaced.

Figure 3:
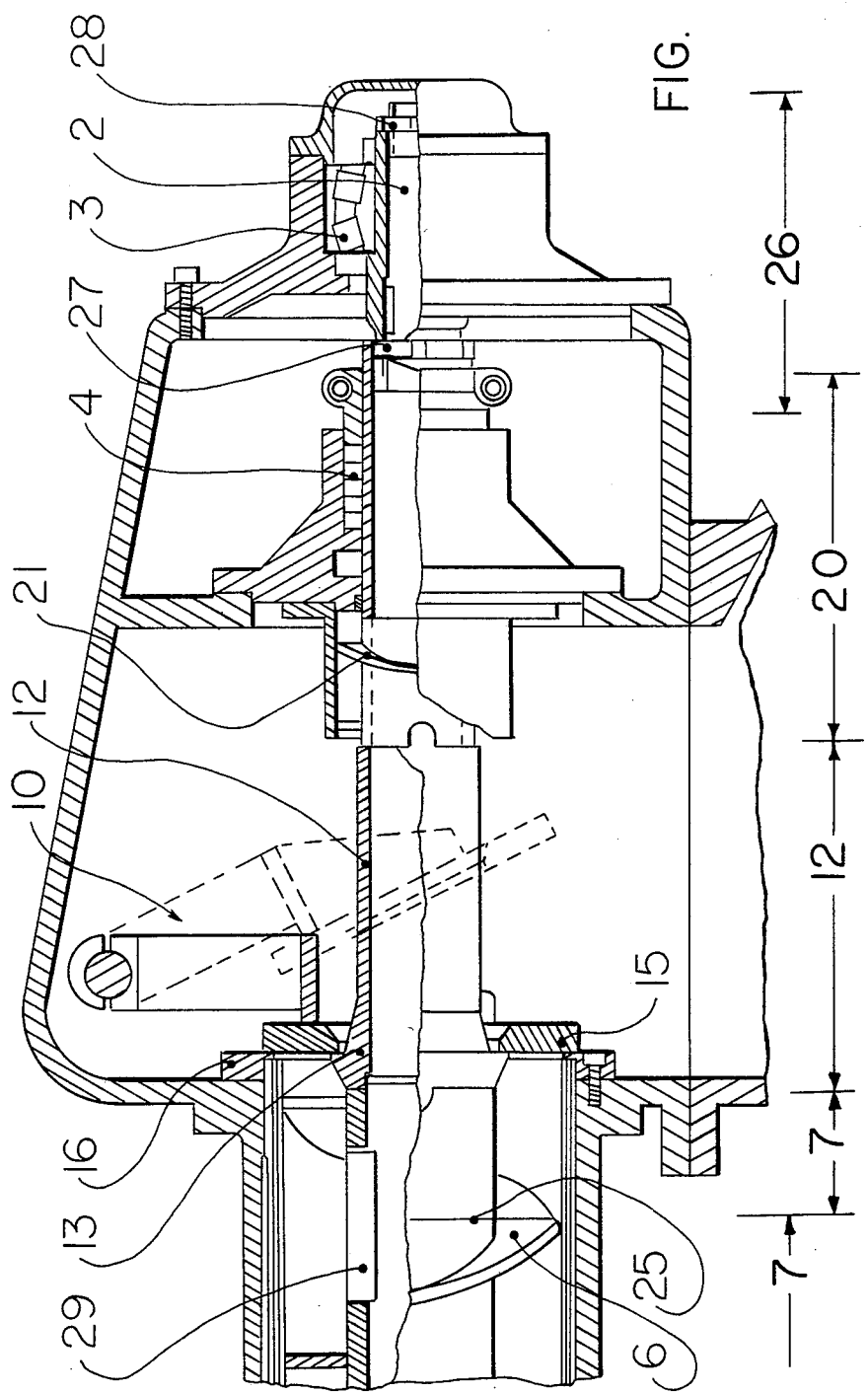
FIG. 3 shows a detail of another embodiment of the invention in a schematic section.

FIG. 3 shows an especially advantageous embodiment in which a plurality of casings is located on screw conveyor shaft 2. In particular, from left to right, two casing 7 separated at 25 are provided for screw conveyor 6. The left casing 7 is prevented by an annular bear, a ring or the like provided on the screw conveyor shaft at the left end of casing 7 from moving to the left over and beyond this annular stop.

Right casing 7 is followed immediately by casing 12, which carries the area of enlarged diameter 13. This casing 12 is followed on the right by casing 20, which carries screw conveyor 21 running in the opposite direction and seal 4.

All these casings touch each other directly, can shift in an axial direction on the shaft and are secured against rotating in relation to each other and to shaft 2, as is indicated, for example, at 29.

The end (the right end in FIG. 3) of casing 20 overlaps casing 26, which is connected in such a manner to bearing 3 that casing 26 is held fast in an axial direction. Ring nut 27 is fastened to the left end of casing 26, by means of which nut casing 20 and therewith the other casings can be shifted to the left. Ring nut 28 is provided on shaft 2 to the right of casing 26, by means of which nut casing 26 can be pressed to the left in relation to shaft 2, or more precisely stated, since casing 26 cannot be shifted due to the construction of bearing 3, shaft 2 can be pulled to the right.

As the movement of casings 7, 12, 20 to the left in relation to the shaft is limited by an annular stop, casing 7, 12, 20 can be moved to the right or the left by appropriately tightening nuts 27, 28. This makes it possible to set the play of the nonreturn valve, i.e., the play between the sealing surfaces of area 13 of enlarged diameter and of annular element 15 in a very precise and simple manner. Moreover, all casings can easily be pulled off the shaft so that wear parts can be replaced with ease.

This invention is not limited to the preferred embodiment heretofore described, to which variations and improvements may be made consisting of mechanically and electrically equivalent modifications to component parts, without leaving the scope of protection of the present patent, the characteristics of which are summarized in the following claims.

What is claimed is:

1. A pump for conveying pulverized and granular material comprising:
   a shaft;
   screw conveyors mounted on each end of said shaft;
   a housing with an inlet for the material to be conveyed and an outlet at higher gas pressure than at said inlet;
   a nonreturn valve with a pivotable closing element located between said screw conveyors, said closing element having an annular shape defining a completely annular opening surrounding said shaft, the portion of said shaft upstream of said closing element being larger in diameter than the portion surrounded by the closing element, the diameter of the annular opening of said closing element being smaller than that of the diameter of the upstream portion of said shaft but larger than said portion of said shaft which passes through said element, whereby said closing element cooperates with the upstream portion of the shaft to form a seal with the upstream portion of the shaft.

2. A pump as in claim 1 where said portions of different diameter shaft are provided by use of at least one removable casing over a main shaft.

3. A pump as in claim 2 where the pivot of said closing element is located downstream of the closed position of said closing element.

4. A pump as in claim 3 where a clearance of no less than 0.2 mm and no greater than 0.5 mm is provided between said annular opening and said enlarged portion of said shaft.

5. A pump as in claim 4 where said screw conveyors are located on removable casings.

6. A pump as in claim 5 where the bearings of said shaft are located on removable casings.

7. A pump as in claim 6 where all removable casings can be shifted in an axial direction.

* * * * *